US012229515B2

(12) United States Patent
Chen et al.

(10) Patent No.: US 12,229,515 B2
(45) Date of Patent: Feb. 18, 2025

(54) ADAPTIVE KNOWLEDGE GRAPH REPRESENTATION LEARNING METHOD FOR INTEGRATING GRAPH STRUCTURE WITH TEXT INFORMATION

(71) Applicant: ZHEJIANG UNIVERSITY, Zhejiang Province (CN)

(72) Inventors: Huajun Chen, Zhejiang Province (CN); Yushan Zhu, Zhejiang Province (CN); Wen Zhang, Zhejiang Province (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 229 days.

(21) Appl. No.: 17/923,566

(22) PCT Filed: Dec. 3, 2021

(86) PCT No.: PCT/CN2021/135512
§ 371 (c)(1),
(2) Date: Nov. 4, 2022

(87) PCT Pub. No.: WO2022/135120
PCT Pub. Date: Jun. 30, 2022

(65) Prior Publication Data
US 2023/0186030 A1 Jun. 15, 2023

(30) Foreign Application Priority Data

Dec. 21, 2020 (CN) .......................... 202011520309.5

(51) Int. Cl.
*G06F 40/30* (2020.01)
*G06F 40/279* (2020.01)
*G06N 5/022* (2023.01)

(52) U.S. Cl.
CPC ............ *G06F 40/30* (2020.01); *G06F 40/279* (2020.01); *G06N 5/022* (2013.01)

(58) Field of Classification Search
None
See application file for complete search history.

(56) References Cited

U.S. PATENT DOCUMENTS

| 2017/0177715 | A1* | 6/2017 | Chang | G06N 5/04 |
| 2019/0122111 | A1* | 4/2019 | Min | G06N 3/045 |
| 2022/0188895 | A1* | 6/2022 | Lipka | G06N 5/04 |

FOREIGN PATENT DOCUMENTS

| CN | 111260064 | 6/2020 |
| CN | 111260064 A * | 6/2020 |

(Continued)

OTHER PUBLICATIONS

P. Gong, J. Liu, Y. Yang and H. He, "Towards Knowledge Enhanced Language Model for Machine Reading Comprehension," in IEEE Access, vol. 8, pp. 224837-224851, 2020 (Year: 2020).*

*Primary Examiner* — Andrew C Flanders
*Assistant Examiner* — Theodore Withey
(74) *Attorney, Agent, or Firm* — Jiwen Chen; Joywin IP Law PLLC

(57) ABSTRACT

The present invention discloses an adaptive knowledge graph representation learning method for integrating a graph structure with text information, including: (1) sampling a neighbor triple of each of a head entity and a tail entity in a target triple; (2) calculating semantic representations of the target triple, and neighbor triples of its head and tail entities; (3) calculating structure representations of the head and tail entities of the target triple; (4) splicing the semantic representation of the target triple with the structure representations of its head and tail entities, inputting a spliced result into an adaptive classification layer, and calculating a classification result and a classification loss; and (5) optimizing the foregoing module based on an optimization algorithm of gradient descent, until a loss value converges, to obtain a final spliced result between the semantic representation of (Continued)

the target triple and the structure representations of its head and tail entities. The present invention can simultaneously capture the semantic representation and graph structure representation of the knowledge graph, and adaptively integrate and fully utilize the semantic and structure information, thereby imparting better robustness to a knowledge graph with insufficient information.

4 Claims, 1 Drawing Sheet

(56) References Cited

FOREIGN PATENT DOCUMENTS

| | | |
|---|---|---|
| CN | 111753101 | 10/2020 |
| CN | 112100404 | 12/2020 |
| WO | WO2019050968 | 3/2019 |

\* cited by examiner

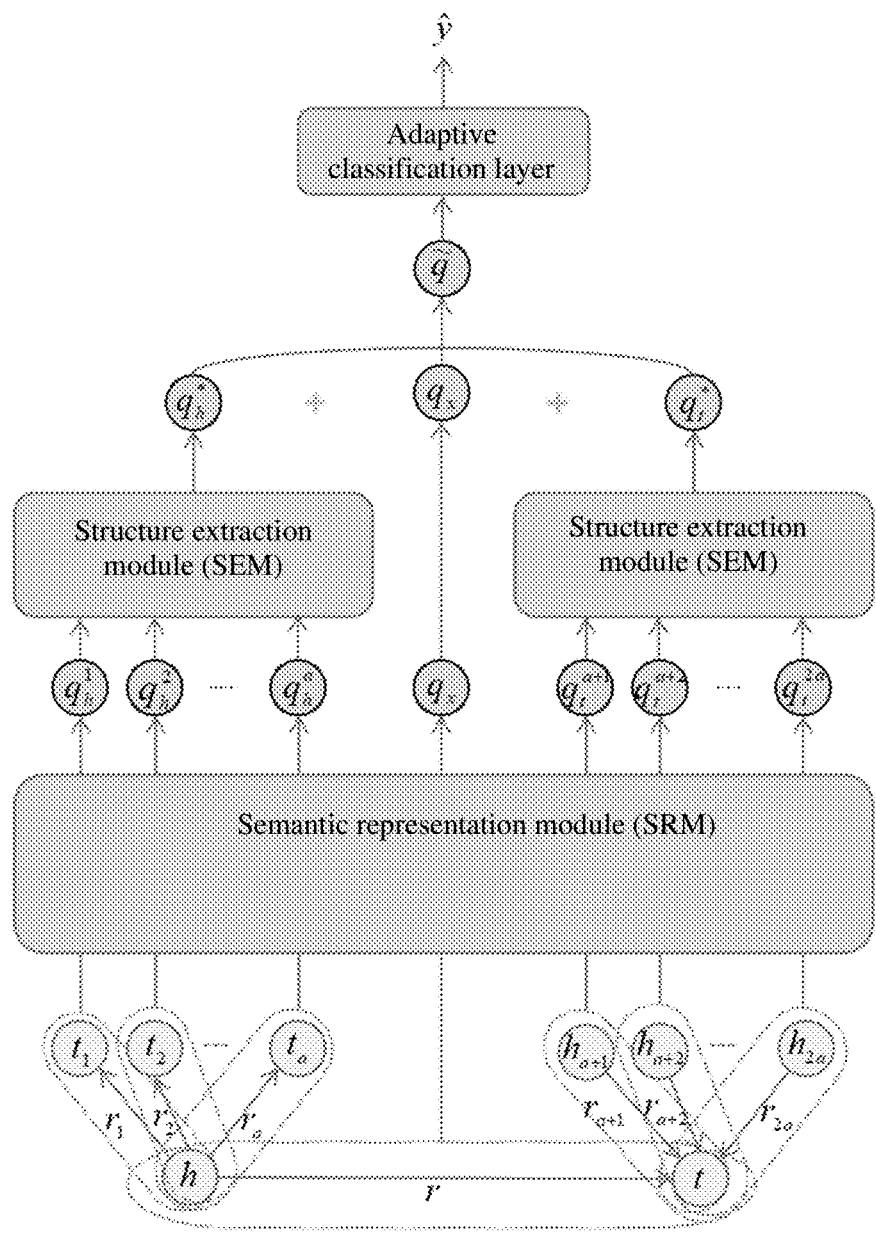

ADAPTIVE KNOWLEDGE GRAPH REPRESENTATION LEARNING METHOD FOR INTEGRATING GRAPH STRUCTURE WITH TEXT INFORMATION

This is a U.S. national stage application of PCT Application No. PCT/CN2021/135512 under 35 U.S.C. 371, filed Dec. 3, 2021 in Chinese, claiming priority of Chinese Application No. 202011520309.5, filed Dec. 21, 2020, all of which are hereby incorporated by reference.

FIELD OF TECHNOLOGY

The present invention relates to the technical field of knowledge graph representation, and in particular to an adaptive knowledge graph representation learning method for integrating a graph structure with text information.

BACKGROUND TECHNOLOGY

Knowledge graphs (KGs) such as FreeBase, YAGO, and WordNet, have been gradually built, and provide an effective foundation for many important AI tasks, such as semantic search, recommendation, and question& answer. A knowledge graph is usually a multi-relationship graph, including an entity, a relation, and a triple. Each triple in which an entity is used as a node, and a relation is used as an edge, represents a piece of knowledge. A triple is represented in the form of (head entity, relation, tail entity represented by (h, r, t)). For example (Jobs, created, Apple) means a piece of knowledge: "Jobs created Apple". Knowledge graphs always include a large load of information in which two pieces of more important information are structure information and text information. The structure information refers to a connection between an entity and another entity through a relation. The structure information of an entity can be usually reflected in its neighbor triples. The text information refers to the semantic information of the text descriptions about an entity and a relation in the knowledge graph, and is usually embodied by the names of and extra text description about the entity and the relation.

Most current knowledge graphs have not been completed yet, thus motivating the task of completing the knowledge graphs, which aims to evaluate the plausibility of triples that is not present in the knowledge graphs. Currently, many researches are implemented to finish and complete the knowledge graphs. For example, in a common method, which is referred to as knowledge graph embedding, an entity and a relation in a triple are mapped to low-dimensional dense vectors, and then these vectors are used to evaluate the plausibility of the triple. There are generally two methods to generate mainstream knowledge graph embeddings. One is to do so through knowledge graph structure information by using, for example, the translation model TransE, the bilinear model DistMult, and the rotation model RotatE. Such a method is simple, effective, and widely used. However, in this method, text information of a knowledge graph is used insufficiently (e.g., too sparse and unconnected). As a result, this knowledge graph fails to have a good representation ability. For example, the geographical knowledge graph is usually quite sparse, and the triples therein are scattered with each other and lack good connectivity. The second method is to generate the knowledge graph embedding through the knowledge graph text information by using, for example, a pre-trained language model KG-Bert. In this method, the text information of the knowledge graph is used fully, and a knowledge graph with rich text information can achieve a relatively high precision. However, because the structure information is used insufficiently (e.g., irregular naming, and insufficient text description), the effect of the knowledge graph generated by using this method is poor. For example, the knowledge graphs, from which beneficial text information cannot be obtained, generated temporarily in practical applications are named irregularly (machine code naming, and random naming), without extra text description.

Because many knowledge graphs in practical scenarios are information-deficient, that is, there are not rich structure information and text information at the same time, the current mainstream knowledge graph representation methods are usually only applicable to one of these situations, lacking robustness and general value.

SUMMARY OF THE INVENTION

The present invention provides an adaptive knowledge graph representation learning method for integrating a graph structure with text information, which makes a knowledge graph without sufficient structure information or text information relatively robust, and can achieve better completion and prediction effects.

The adaptive knowledge graph representation learning method for integrating a graph structure with text information includes the following steps:
(1) sampling a neighbor triple of each of a head entity and a tail entity in a target triple;
(2) calculating, by a semantic representation module (SRM), semantic representations of the target triple, and neighbor triples of its head and tail entities;
(3) inputting the semantic representations of the neighbor triples of the head and tail entities of the target triple into a structure extraction module (SEM), and calculating structure representations of the head and tail entities of the target triple by using the following formula:
(4) splicing the semantic representation of the target triple with the structure representations of its head and tail entities, inputting a spliced result into an adaptive classification layer, and calculating a loss by using an outputted probability distribution and a true label; and
(5) optimizing the foregoing module based on an optimization algorithm of gradient descent, until a loss value converges, to obtain a final spliced result between the semantic representation of the target triple and the structure representations of its head and tail entities.

In the present invention, the semantic representations and structure representations of each triple are learned, and are all low-dimensional dense vectors. Finally, implicit reasoning is completed through adaptive fusion calculation between the semantic representations and the structure representations, to complete the knowledge graph. In this method, it is preferable to use the knowledge graph structure information automatically when the knowledge graph has rich structure information and insufficient text information, and vice versa.

A specific process of step (1) includes:
making G represent a knowledge graph, E represent an entity set in the knowledge graph, and R represent a relation set in the knowledge graph; and sampling the neighbor triples of the head and tail entities of the target triple x=(h, r, t), where the neighbor triples include two parts, namely, head-entity neighbor triples and tail-entity neighbor triples, which are expressed as N(h)={$x_h^1, x_h^2, \ldots, x_h^a$}, and N(t)={$x_t^{a+1}, x_t^{a+2}, \ldots, x_t^{2a}$} respectively, where $x_h^i$=(h, $r_i$, $t_i$), i=1, 2, . . . , a, $x_t^j$=($h_j$, $r_j$, t), j=a+1, a+2, . . . , 2a, $r_i$, $r_j \in$ R, $t_i$, $h_j \in$ E, and $x_h^i$, $x_t^j \in$ G; and α is a settable hyperparameter, representing a quantity of neighbor triples of sampled head and tail entities.

In step (2), the semantic representation module (SRM) uses a pre-trained language model bert, and deletes a last classification layer of the model bert.

The semantic representation module inputs a sentence sequence formed by text descriptions about the head entity, a relation, and the tail entity of the triple in order, the text descriptions about the entity and the relation are separated by a delimiter [SEP], and an output identifier [OUT] is added to a header of the sequence.

The semantic representation module outputs an output vector corresponding to [OUT] in a last hidden layer of the module, and the output vector is the semantic representation of the correspondingly inputted triple.

The semantic representation of the target triple x is expressed by using a formula as follows:

$$q_x = SRM(x).$$

The semantic representations of neighbor triples of a head entities and a tail entities of the target triple x are expressed respectively by using the following formulas:

$$q_h^i = SRM(x_h^i), i=1,2,\ldots a \text{ and}$$

$$q_t^j = SRM(x_t^j), j=a+1, a+2, \ldots 2a.$$

Each trained sample obtains one own semantic representation, semantic representations of a head-entity neighbor triples, and semantic representations of a tail-entity neighbor triples.

The result of extracting structure information from the neighbor triples of the entities should be independent of the arrangement order of the inputted semantic representations of the neighbor triples.

In step (3), the structure extraction module (SEM) uses two layers of set-transformers. The set-transformer is an improved version of the transformer, and has better performance than the original one, while accepting order-independent inputs.

A specific process of calculating the structure representations of the head and tail entities of the target triple includes:
arranging the semantic representations $q_h^i$(i=1, 2, . . . a) obtained in step (2) of the head-entity neighbor triples into a sequence, inputting the sequence into the structure extraction module (SEM), and taking an output of the structure extraction module as the structure representation of an entity h by using the following formula:

$$q_h^* = SEM(q_h^1, q_h^2, \ldots, q_h^a), \text{ and}$$

inputting the semantic representations of the a neighbor triples of the tail entity t of the target triple into the structure extraction module (SEM), and calculating the structure representation of the tail entity t by using the following formula:

$$q_t^* = SEM(q_t^{a+1}, q_t^{a+2}, \ldots, q_t^{2a}).$$

In step (4), the adaptive classification layer is a fully connected layer with a weight of $W \in R^{2 \times (H_1 + 2H_2)}$, where $H_1$ represents a size of a hidden layer of the semantic representation module (SRM), and $H_2$ represents a size of a hidden layer of the structure extraction module (SEM).

The specific process of step (4) is:
splicing the semantic representation $q_x$ calculated in step (2) of the target triple with the structure representations calculated in step (3) of its head and tail entities by using the following formula:

$$\tilde{q} = [q_h^* | q_x | q_t^*];$$

inputting $\tilde{q}$ into the adaptive classification layer, where an output probability of the target triple x=(h, r, t) is expressed by using the following formula:

$$\hat{y} = P(y|x) = \text{softmax}(\tilde{q}W_T + \beta)$$

where $\beta \in R^2$ is a random offset, $\hat{y} = (\hat{y}_0, \hat{y}_1) \in R^2$, $\hat{y}_0, \hat{y}_1 \in [0,1]$, and $\hat{y}_0 + \hat{y}_1 = 1$; and calculating a cross-entropy loss by using $\hat{y}$ and a true triple label y by using the following formula:

$$\text{Loss} = -\sum_x (y \log(\hat{y}_0) + (1-y)\log(\hat{y}_1))$$

wherein y=1 if the target triple x=(h, r, t) is a positive sample, otherwise, y=0.

In step (5), the foregoing module is optimized based on an optimization algorithm of gradient descent, until a loss value converges. The final output of the model is a spliced result $\tilde{q}$ between the semantic representation of the target triple and the structure representations of its head and tail entities.

Compared with most of the existing knowledge graph representation methods, which cannot be well compatible with structure information or semantic information at the same time, the adaptive knowledge graph representation learning method for integrating a graph structure with text information provided by the present invention has the following specific advantages:

(1) The present invention can simultaneously capture the semantic representation and structure representation of the knowledge graph, and adaptively integrate and fully utilize the semantic and graph structure information of the knowledge graph.

(2) In this method, when the knowledge graph is rich in text information but lacks structure information, it is preferable to use the text information automatically; and when the knowledge graph is rich in structure information but lacks text information, it is preferable to use the structure information automatically. The present invention shows better robustness when the structure or text information of the knowledge graph is insufficient, and can be well applied to scenarios such as knowledge graph completion, relationship prediction, and triple classification.

BRIEF DESCRIPTION OF THE DRAWINGS

FIG. 1 is a schematic flowchart of a knowledge graph representation learning method for integrating a graph structure with text information according to the present invention.

DETAILED DESCRIPTION OF THE EMBODIMENTS

The present invention is further described in detail below with reference to the accompanying drawings and embodiments. It should be pointed out that the following embodiments are intended to facilitate the understanding of the present invention, but do not have any limiting effect on it.

As shown in FIG. 1, the adaptive knowledge graph representation learning method for integrating a graph structure with text information includes the following steps:

S01: Sample a neighbor triple of each of a head entity and a tail entity in a target triple.

The target triple is set to be x=(h, r, t). For simplicity, the sampling quantity of the neighbor triples of each of the head and tail entities to 3, that is, a=3. The three neighbor triples of the head entity h are recorded as $x_h^1$=(h, $r_1$, $t_1$), $x_h^2$=(h, $r_2$, $t_2$), and $x_h^3$=(h, $r_3$, $t_3$) respectively. The three neighbor triples of the tail entity t are recorded as $x_t^4$=($h_4$, $r_4$, t), $x_t^5$=($h_5$, $r_5$, t), and $x_t^6$=($h_6$, $r_6$, t) respectively.

S02: A semantic representation module (SRM) calculates semantic representations of the target triple, and neighbor triples of its head and tail entities.

The semantic representation module (SRM) uses a pre-trained language model Bert-base, and deletes the last classification layer of the Bert-base model. A size of its hidden layer is 768, that is, $H_1$=768. All relevant parameters of this module are initialized according to the Bert-base model, and this model includes word vector layers and hidden layers.

The corresponding input form of the target triple x=(h, r, t) in the semantic representation module (SRM) is <[OUT] h_description [SEP] r_description [SEP] t_description>. For simplicity, the names of the head entity, a relation, and the tail entity are used directly as their respective text descriptions. If a maximum length of the text description of a single entity or relation is set to 8 word fragments, the maximum length of a sequence inputted by the semantic representation module is set to 27 (1+8+1+8+1+8=27). The inputted sequence is segmented and processed as a two-dimensional matrix with a size of (27, $H_1$) by a word vector layer, and then is passed to the hidden layer.

Similarly, the input forms of the neighbor triples of the head entity h and the tail entity t in the semantic representation module are respectively as follows:

$x_h^1$=(h, $r_1$, $t_1$): <[OUT] h_description [SEP] $r_1$_description [SEP] $t_1$_description>;
$x_h^2$=(h, $r_2$, $t_2$): <[OUT] h_description [SEP] $r_2$_description [SEP] $t_2$_description>;
$x_h^3$=(h, $r_3$, $t_3$): <[OUT] h_description [SEP] $r_3$_description [SEP] $t_3$_description>;
$x_t^4$=($h_4$, $r_4$, t): <[OUT] $h_4$_description [SEP] $r_4$_description [SEP] t_description>;
$x_t^5$=($h_5$, $r_5$, t): <[OUT] $h_5$_description [SEP] $r_5$_description [SEP] t_description>; and
$x_t^6$=($h_6$, $r_6$, t): <[OUT] $h_6$_description [SEP] $r_6$_description [SEP] t_description>.

These inputted sequences are also each processed by the word vector layer to form a two-dimensional matrix with a size of (27, $H_1$), and then are passed to the hidden layer. Finally, the semantic representation of the target triple outputted by the semantic representation module is $q_x$. The semantic representations of the three head-entity neighbor triples are $q_h^1$, $q_h^2$, $q_h^3$ respectively. The semantic representations of the three tail-entity neighbor triples are $q_t^4$, $q_t^5$, $q_t^6$ respectively. They are all $H_1$-dimensional vectors.

S03: A structure extraction module (SEM) calculates structure information of the head and tail entities of the target triple.

The structure extraction module uses two layers of set-transformers. The size of the hidden layer is set to 768, that is, $H_2$=768, all relevant parameters of this module are randomly initialized through uniform distribution. First, the semantic representations $q_h^1$, $q_h^2$, $q_h^3$ obtained in step (2) of the neighbor triples of the head entity are randomly arranged to obtain a two-dimensional input matrix with a size of (3, $H_1$). Then, the matrix is inputted into the structure extraction module (SEM), to output a structure representation $q_h^*$ of the head entity, which is a $H_2$-dimensional vector.

Similarly, the semantic representations $q_t^4$, $q_t^5$, $q_t^6$ the neighbor triples of the tail entity are randomly arranged to obtain a two-dimensional input matrix with a size of (3, $H_1$). Then, the matrix is inputted into the structure extraction module (SEM), to output a structure representation $q_t^*$ of the tail entity, which is a $H_2$-dimensional vector.

S04: Splice the semantic representation of the target triple with the structure representations of its head and tail entities, input a spliced result into an adaptive classification layer, and calculate a loss.

The adaptive classification layer is a fully connected layer with a weight of $W \in R^{2 \times (H_1 + 2H_2)}$. A random offset is $\beta \in R^2$. An activation function is softmax. The input dimension of the classification layer is $H_1 + H_2$, and the output dimension is 2. All relevant parameters of this module are randomly initialized through uniform distribution. First, $q_h^*$, $q_x$, $q_t^*$ are spliced directly in order to obtain the final triple representation $\tilde{q}$, which is a $H_1 + 2H_2$-dimensional vector, and then the $\tilde{q}$ is inputted into the adaptive classification layer to obtain a final prediction result $\hat{y} = (\hat{y}_0, \hat{y}_1)$, where $\hat{y}_0, \hat{y}_1 \in [0, 1]$, $\hat{y}_0 + \hat{y}_1 = 1$, and $\hat{y}_0$ represents a possibility that a triple is determined as a positive example. If $\hat{y}_0 > \hat{y}_1$, the triplet is considered as a positive example, and otherwise, the triple is considered as a negative example.

The cross-entropy loss value Loss is calculated by using the $\hat{y} = (\hat{y}_0, \hat{y}_1)$ and the true triplet label y (y=1 if the target triple is a positive sample, and otherwise y=0).

S05: Perform optimizing based on an optimization algorithm of gradient descent, until a loss value converges, to obtain a final spliced result $\tilde{q}$ between the semantic representation of the target triple and the structure representations of its head and tail entities.

In the foregoing embodiments, the technical solutions and beneficial effects of the present invention are described in detail. It should be understood that the above descriptions are only the specific embodiments of the present invention, and are not intended to limit the present invention. Any modifications, additions and equivalent replacements made within the scope of the principles of the present invention shall fall into the protection scope of the present invention.

The invention claimed is:

1. An adaptive knowledge graph representation learning method for integrating a graph structure with text information, comprising the following steps:
   (1) sampling a neighbor triple of each of a head entity and a tail entity in a target triple;
   (2) calculating, by a semantic representation module (SRM), semantic representations of the target triple, and neighbor triples of its head and tail entities, wherein the semantic representation module (SRM) uses a pre-trained language model bert, and deletes a last classification layer of the model bert;
   the semantic representation module inputs a sentence sequence formed by text descriptions about the head entity, a relation, and the tail entity of the triple in order, the text descriptions about the entity and the relation are separated by a delimiter [SEP], and an output identifier [OUT] is added to a header of the sequence;
   the semantic representation module outputs an output vector corresponding to [OUT] in a last hidden layer of the module, and the output vector is the semantic representation of the correspondingly inputted triple;

the semantic representation of the target triple x is expressed by using the following formula:

$$q_x = SRM(x);$$

the semantic representations of neighbor triples of a head entities and a tail entities of the target triple x are expressed respectively by using the following formulas:

$$q_h^i = SRM(x_h^i), i=1,2,\ldots a \text{ and}$$

$$q_t^j = SRM(x_t^j), j=a+1, a+2, \ldots 2a; \text{ and}$$

each trained sample obtains one own semantic representation, semantic representations of a head-entity neighbor triples, and semantic representations of a tail-entity neighbor triples;

(3) inputting the semantic representations of the target triple, and the neighbor triples of its head and tail entities into a structure extraction module (SEM), and calculating structure representations of the head and tail entities of the target triple, wherein the structure extraction module (SEM) uses two layers of set-transformers; and a specific process of calculating the structure representations of the head and tail entities of the target triple comprises:

arranging the semantic representations $q_h^i$ (i=1, 2, … a) obtained in step (2) of the head-entity neighbor triples into a sequence, inputting the sequence into the structure extraction module (SEM), and taking an output of the structure extraction module as the structure representation of an entity h by using the following formula:

$$q_h^* = SEM(q_h^1, q_h^2, \ldots, q_h^a), \text{ and}$$

inputting the semantic representations of the α neighbor triples of the tail entity t of the target triple into the structure extraction module (SEM), and calculating the structure representation of the tail entity t by using the following formula:

$$q_t^* = SEM(q_t^{a+1}, q_t^{a+2}, \ldots, q_t^{2a});$$

(4) splicing the semantic representation of the target triple with the structure representations of its head and tail entities, inputting a spliced result into an adaptive classification layer, and calculating a loss by using an outputted probability distribution and a true label; and (5) optimizing the foregoing module based on an optimization algorithm of gradient descent, until a loss value converges, to obtain a final spliced result between the semantic representation of the target triple and the structure representations of its head and tail entities.

2. The adaptive knowledge graph representation learning method for integrating a graph structure with text information according to claim 1, wherein a specific process of step (1) comprises:

letting G represent a knowledge graph, E represent an entity set in the knowledge graph, and R represent a relation set in the knowledge graph; and sampling the neighbor triples of the head and tail entities of the target triple x=(h, r, t), wherein the neighbor triples comprise two parts, namely, head-entity neighbor triples and tail-entity neighbor triples, which are expressed as $N(h) = \{x_h^1, x_h^2, \ldots, x_h^a\}$, and $N(t) = \{x_t^{a+1}, x_t^{a+2}, \ldots, x_t^{2a}\}$ respectively, wherein $x_h^i = (h, r_i, t_i)$, i=1, 2, …, a, $x_t^j = (h_j, r_j, t)$, j=a+1, a+2, …, 2a, $r_i, r_j \in R$, $t_i, h_j \in E$, and $x_h^i, x_t^j \in G$; and a is a settable hyperparameter, representing a quantity of neighbor triples of sampled head and tail entities.

3. The adaptive knowledge graph representation learning method for integrating a graph structure with text information according to claim 1, wherein in step (4), the adaptive classification layer is a fully connected layer with a weight of $W \in R^{2 \times (H_1 + 2H_2)}$, wherein $H_1$ represents a size of a hidden layer of the semantic representation module (SRM), and $H_2$ represents a size of a hidden layer of the structure extraction module (SEM).

4. The adaptive knowledge graph representation learning method for integrating a graph structure with text information according to claim 1, wherein a specific process of step (4) comprises:

splicing the semantic representation $q_x$ calculated in step (2) of the target triple with the structure representations calculated in step (3) of its head and tail entities by using the following formula:

$$\tilde{q} = [q_h^* | q_x | q_t^*];$$

inputting $\tilde{q}$ into the adaptive classification layer, wherein an output probability of the target triple x=(h, r, t) is expressed by using the following formula:

$$\hat{y} = P(y|x) = \text{softmax}(\tilde{q}W^T + \beta)$$

wherein $\beta \in R^2$ is a random offset, $\hat{y} = (\hat{y}_0, \hat{y}_1) \in R^2$, $\hat{y}_0, \hat{y}_1 \in [0,1]$, and $\hat{y}_0 + \hat{y}_1 = 1$; and calculating a cross-entropy loss by using $\hat{y}$ and a true triple label y by using the following formula:

$$\text{Loss} = -\sum_x \left( y \log(\hat{y}_0) + (1-y) \log(\hat{y}_1) \right)$$

wherein y=1 if the target triple x=(h, r, t) is a positive sample, otherwise, y=0.

* * * * *